2,987,405
TREATMENT OF ALUMINOSILICATES
Arthur N. Baumann, Lakeland, Fla., assignor to International Minerals & Chemical Corporation, a corporation of New York
No Drawing. Filed June 26, 1958, Ser. No. 744,670
7 Claims. (Cl. 106—72)

This invention generally relates to a method of treating aluminosilicates. More particularly, the invention relates to a method of enriching aluminosilicates with potassium to provide a material suitable for use in the preparation of ceramic and glass products.

Aluminosilicates of various types have been used heretofore in the preparation of ceramic and glass products. Aluimosilicates having the chemical formula $Al_2SiO_5$, such as andalusite, sillimanite, and kyanite, have been used in the preparation of porcelain for spark plugs and other refractory materials.

Compounds of aluminosilicates such as feldspars are also useful in the preparation of glass and ceramic products. Potassium feldspars ($KAlSi_3O_8$) such as microcline and orthoclase, sodium feldspars ($NaAlSi_3O_8$) such as albite, and mixed sodium-potassium feldspars, such as perthite are found naturally as pegmatites admixed with silica. Generally the pegmatites are subjected to ore dressing techniques to remove silica impurities and to produce a concentrate having an increased potassium to aluminum or sodium to aluminum molar ratio. High purity potassium feldspar has been used in the preparation of pottery, ceramic insulation, and specialty glass products. High purity sodium feldspars have been used in the preparation of pottery glazes.

Numerous processes have been developed for the separation of potassium feldspars from quartz to produce a concentrate suitable for use in the preparation of ceramic materials. Pegmatites containing potassium feldspar may be beneficiated by flotation, electrostatic separation, or the like, to produce a concentrate having an increased K/Al molar ratio. The tailing fraction from these beneficiation operations may be a mixture of potassium feldspar, sodium feldspar and quartz. The tailing fraction generally contains small proportions of potassium feldspar, for example, between about 3 and about 5% $K_2O$ by weight, and an equivalent amount of sodium feldspar, the remainder of the material being silica. Heretofore, this tailing fraction has been discarded, thereby resulting in a loss of a substantial proportion of the potassium originally present in the ore. Conversion of this tailing fraction into a material suitable for use in the ceramic and glass industries, for example, by increasing the $K_2O$ content of this material to above about 7% by weight, not only would substantially reduce the loss of potassium values, but also would reduce the overall cost of the feldspar beneficiation process.

The term "aluminosilicate" as used throughout the description and claims is intended to include pure aluminosilicates such as those having the chemical formula $Al_2SiO_5$, compounds of the aluminosilicates such as the minerals known as feldspars, clays of the kaolin, bentonite and montmorillonite type, and mixtures thereof.

It is an object of this invention to enrich aluminosilicates with potassium.

Another object of this invention is to increase the potassium to aluminum ratio of aluminosilicates.

Still another object of this invention is to increase the potassium to aluminum ratio of feldspar.

These and other objects of the invention will become apparent from the following detailed description.

It has now been discovered that aluminosilicates can be enriched with potassium by heating in admixture with a basic-reacting potassium compound, as hereinafter defined, at a temperature in the range above about 1200° F. and below the fusion temperature of the mixture. The heat treated material is cooled and leached with an aqueous medium to dissolve soluble constituents such as sodium salts and unreacted potassium salts therein. The resulting potassium-enriched aluminosilicate, after being separated from the liquid and dried, is suitable for use in the preparation of ceramic and glass products. The leach liquor can be treated to separate unreacted potassium salts from other soluble salts by means of fractional crystallization or by other means known in the art. Solid potassium salts recovered in this manner may be recycled to the initial heat-treating step.

Any aluminosilicate is contemplated for use in the instant novel process. Minerals such as andalusite, sillimanite, kyanite, mocrocline, orthoclase, albite, perthite, bentonite, kaolin, kaolinite, montmorillonite or mixtures of two or more of these minerals are examples of minerals which may be used in the instant novel process. In addition, these minerals may be admixed with quartz or other gangue, or may be the concentrate or tailing fraction produced in the beneficiation of aluminosilicates. It is preferred to use an aluminosilicate containing a low proportion of iron impurities, for example, less than about 1% $Fe_2O_3$, since large proportions of iron impurities are undesirable in most ceramic and glass products. However, an additional advantage of the instant novel process is that a major portion of the iron present in the aluminosilicate is rendered soluble during the reaction and is dissolved during the subsequent leaching step, thereby permitting the use of aluminosilicates containing iron impurities in proportions which would otherwise be undesirable.

A material suitable for use in the instant novel process is the tailing fraction produced in the electrostatic beneficiation of a microcline-perthite pegmatite ore. The ore is dried, crushed to pass an 8-mesh screen, and then subjected to an electrostatic separation, for example, as set forth in U.S. Patent No. 2,805,771, issued September 10, 1957, to James E. Lawver. Chemical analyses of a typical ore of this type, and the resulting concentrate and tail fractions produced by electrostatic beneficiation thereof, are as follows:

| Component | Ore, percent | Concentrate, percent | Tails, percent |
| --- | --- | --- | --- |
| $SiO_2$ | 73.5 | 69.5 | 84.0 |
| $Na_2O$ | 3.0 | 3.9 | 2.8 |
| $K_2O$ | 8.3 | 10.4 | 2.9 |
| $CaO$ | 0.4 | 0.2 | 0.4 |
| $Fe_2O_3$ | 0.08 | 0.06 | 0.10 |
| $Al_2O_3$ | 14.3 | 16.6 | 8.3 |
| Loss on ignition | 0.4 | 0.4 | 0.4 |

The tailing fraction from this beneficiation operation is a suitable material for treatment in accordance with the instant novel process.

In a preferred embodiment of the invention, aluminosilicates are intimately mixed, prior to heat-treating, with a potassium compound which acts as a base under the conditions prevailing in the subsequent heat-treating, cooling and leaching steps. Such compounds include potassium compounds which are basic-reacting per se, and potassium compounds which are susceptible to reduction to basic-reacting potassium compounds under the heating conditions employed. Reduction of potassium salts, such as potassium sulfate, to a basic-reacting compound during the heating step can be effected by admixing a small proportion of carbonaceous material with the reactants or by admixing a small proportion of basic-reacting sodium compound with the reactants, as discussed more fully below. Typical examples of suitable potassium compounds are potassium sulfate, potassium formate, potassium polyphosphate, potassium acetate, potassium nitrate, potassium carbonate, potassium sulfide, potassium nitride, potassium carbide, potassium hydroxide, and the like. Sufficient basic-reacting potassium compound is added to the mixture to provide a molar ratio of potassium added as the potassium compound to aluminum in the aluminosilicate of between about 1.25:1 and about 2.5:1, and preferably between about 1.3:1 and about 2.3:1. If the molar ratio is less than about 1.25:1, there is generally insufficient potassium present to effect a significant increase in the K:Al molar ratio of the final product. If the molar ratio is in excess of about 2.5:1, the final product may contain excessive proportions of impurities. For example, if the potassium compound is potassium sulfate and the K:Al molar ratio is greater than about 5:1, the product obtained after heat treatment, leaching, and drying, may contain excessive proportions of sulfate impurities.

If a neutral potassium salt, such as potassium sulfate, is used, a small proportion of a carbonaceous material is admixed with the reactants to effect conversion of a salt to a basic compound, such as potassium sulfide, during the heat treating step. Typical examples of suitable carbonaceous materials are petroleum coke, coal, vegetable carbon, carbon black, and mixtures thereof. The carbonaceous material should preferably be substantially free of iron and other substances which may tend to discolor the resulting product. Sufficient carbonaceous material is added to the mixture to provide a weight ratio of potassium compound to carbonaceous material of between about 3:1 and about 40:1, and preferably between about 3.5:1 and about 20:1.

In an alternative embodiment, using a neutral potassium salt, a small proportion of a basic compound such as sodium hydroxide and sodium carbonate is admixed with the reactants, whereby conversion of the neutral potassium salt to a basic-reacting compound is effected by base exchange between the sodium and potassium compounds. Sufficient sodium compound is added to the mixture to provide a weight ratio of potassium compound to sodium compound of between about 3:1 and about 40:1, and preferably between about 3.5:1 and about 20:1.

It is important that the aluminosilicate, basic-reacting potassium compound, and carbonaceous material or sodium compound be in intimate contact during the heating step. For this reason, the reactants should be in finely divided form, and substantially all of the particles should pass a 60 mesh screen (ASTM designation), and preferably a 200 mesh screen. Coarse particles larger than about 20 mesh have a relatively low ratio of surface area to unit weight, and because of the lesser proportions of surface area available for contact, complete reaction of these particles is not readily attained. Since particles in so finely divided a condition may be carried out of the furnace in the exhaust gases prior to reaction, the reactants in finely divided form may be admixed and pelletized with a small amount of water by extrusion, tumbling, or the like prior to firing. The pellets may have an average diameter of the order of about ½ inch, but larger or smaller size pellets may be used if desired.

The reactants in the above described proportions are admixed in a suitable blending apparatus such as a pug mill, and the resulting mixture, either with or without pelletizing, as the case may be, is then conveyed to a suitable heating apparatus, such as an oil-fired rotary kiln. The reactants are heated to a temperature above about 1200° F. but below the fusion temperature, and preferably at a temperature between about 1400 and about 1600° F. Temperatures below about 1200° F. are generally too low to accomplish any significant change in the potassium to aluminum ratio in the aluminosilicate starting material. Fusion of the reactants should be avoided since the fused mass is highly corrosive and difficult to handle and process. In addition, the original structure of the aluminosilicate is wholly or in large part destroyed if fusion occurs. Temperatures between about 1400 and about 1600° F. are preferably employed since optimum increase in the K/Al ratio is obtained at these temperatures without fusion of the reactants.

The reactants are heated at the above described temperatures for a period of at least about 10 minutes, and preferably between about 30 minutes and about 5 hours, varying inversely with the temperature. After around 6 hours, there is ordinarily little or no increase in the K/Al molar ratio of the product for added increments of time.

After heating the reactants in the above described manner, the solids are discharged from the kiln and cooled in a suitable air cooler or by quenching in an aqueous medium. The cooled solids are then leached with water or other aqueous medium to dissolve soluble compounds from the potassium-enriched aluminosilicate. If the solids are cooled by quenching, the same aqueous medium can be used for both quenching and leaching. Leaching can be accomplished by slurrying the cooled solids with water or other aqueous medium and agitating the slurry for between about 1 and about 3 hours at a temperature preferably between about 70 and about 150° F. However, higher or lower temperatures may be used if desired. After leaching, the slurry is filtered, and the resulting filter cake is heated to dryness. The resulting solid is a potassium-enriched aluminosilicate suitable for use as a component of ceramic and glass products.

When a mixture of quartz and a sodium-potassium feldspar is treated in accordance with the above described procedure, a comparison of the X-ray diffraction pattern for the starting material and the product shows that the intensity of the lines associated with quartz and albite (sodium feldspar) is decreased while the intensity of the lines associated with microcline (potassium feldspar) is increased. This comparison demonstrates that some degree of base exchange of potassium and sodium occurs during the reaction. However, chemical analyses show that the total alkali to $Al_2O_3$ molar ratio of the product is substantially greater than in the starting material, thereby indicating that potassium ions were likely inserted into the existing crystal lattice during the reaction. The comparison further shows that potassium enrichment of the feldspar is effected without substantial destruction of the original feldspar structure.

The filtrate remaining after separation of potassium-enriched solids generally contains soluble potassium compounds which may be recovered by evaporation or the like, and recycled for reaction with additional aluminosilicate. Filtrates which contain sodium, potassium, and sulfate ions, for example, filtrates produced by leaching the reaction product of perthite, potassium sulfate, and carbon, may be admixed with glaserite ($Na_2SO_4 \cdot 3K_2SO_4$) until the specific gravity of the solution is about 1.17, whereby potassium sulfate precipitates. Solid potassium sulfate is separated and recycled for reaction with additional aluminosilicate. The resulting solution is evaporated to a water content between about 45 and about 50% by weight, then cooled to a temperature of about 50° C., whereby glaserite is crystallized. The crystals are separated from the solution and recycled for reaction with additional filtrate to precipitate potassium sulfate. The glaserite mother liquor containing dissolved salts such as sodium sulfate is discarded, or if desired, may be recycled to the leaching step.

If an aluminosilicate containing a relatively high proportion of iron impurities is treated in accordance with the novel process, a major portion of the iron is rendered soluble during the heat treatment and is dissolved in the leaching solution. Iron may be removed as an iron salt from the leach solution by means of fractional crystallization or by other means known in the art.

The following examples are presented to further define the invention without any intent to be limited thereby. All percentages are by weight unless otherwise specified.

Example 1

A microcline-albite pegmatite ore was dried and crushed to pass an 8-mesh screen. The ore was then subjected to an electrostatic beneficiation process as described in U.S. Patent No. 2,805,771, referred to above, to produce a concentrate and a tail fraction. Chemical analyses of the ore and the resulting concentrate and tail were as follows:

| Component | Ore, percent | Concentrate, percent | Tails, percent |
|---|---|---|---|
| SiO₂ | 73.5 | 66.9 | 79.9 |
| Na₂O | 3.0 | 2.5 | 3.5 |
| K₂O | 8.3 | 9.9 | 3.6 |
| CaO | 0.4 | 0.2 | |
| Fe₂O₃ | 0.08 | 0.06 | |
| Al₂O₃ | 14.3 | 16.1 | 10.7 |

The concentrate was stored for use in the preparation of ceramic products.

The tailing fraction was comminuted to pass a 60 mesh screen and was divided into three portions, designated as A, B, and C.

Portion A, weighing 22.0 grams, was admixed with 9.1 grams of potassium sulfate and 0.5 gram of vegetable carbon. The resulting mixture was heated in a muffle furnace at a temperature of about 1500° F. for about 1 hour. The heat-treated mixture was leached by slurrying the solids with about 50 cc. of water, then filtering. The resulting filter cake was heated to dryness. Chemical analyses of the dry solids were as follows:

Component: Proportion, percent
K₂O _____ 11.3
Na₂O _____ 2.7
Al₂O₃ _____ 9.2
SO₄⁼ _____ 0.41

For comparison, Portion B (22 grams) was admixed with 9.1 grams of potassium sulfate and treated in the same manner as Portion A, with the exception that no carbon was added. The K₂O content of the product was 4.3%, thereby indicating that substantial potassium enrichment of the feldspar is not effected unless a basic condition is maintained during the reaction.

Example 2

Portion C of Example 1, weighing 22.0 grams, was reacted with potassium sulfate and carbon in the same manner and under the same conditions as in Example 1 with the exception that the mixture was heated at 1500° F. for 3 hours rather than 1 hour. Chemical analyses of the dry product were as follows:

Component: Proportion, percent
K₂O _____ 10.4
Na₂O _____ 1.7
Al₂O₃ _____ 10.7
SO₄⁼ _____ 0.2

Example 3

A microcline-perthite ore was subjected to electrostatic beneficiation as in Example 1 to produce a tailing fraction having the following chemical analyses:

Component: Proportion, percent
K₂O _____ 4.2
Na₂O _____ 3.5
Al₂O₃ _____ 11.2
SiO₂ _____ 80.6

The tailing fraction was divided into two portions, designated as D and E.

Portion D was comminuted to pass a 60 mesh screen, and 15 grams of the comminuted solids were admixed with 4 grams of potassium sulfate and 1 gram of sodium carbonate. The resulting mixture was heated at a temperature of about 1500° F. for about 1 hour. The heat-treated mixture was cooled and leached by slurrying the solids with about 100 cc. of water, then filtering. The solids were heated to dryness. Chemical analyses of the dry solids were as follows:

Component: Proportion, percent
K₂O _____ 7.7
Na₂O _____ 4.3
Al₂O _____ 10.9

Example 4

Portion E from Example 3 was comminuted to pass a 20 mesh screen and 27 grams of the comminuted material were admixed with 8 grams of potassium sulfate and 1 gram of sodium carbonate. The mixture was treated in the same manner as in Example 3. Chemical analyses of the dry product were as follows:

Component: Proportion, percent
K₂O _____ 6.8
Na₂O _____ 2.8
Al₂O _____ 10.0
SiO₂ _____ 80.4

A comparison of the products of Examples 3 and 4 shows that the use of particles less than about 60 mesh (Example 3) results in a product having a higher K₂O content than the product obtained from coarser particles (less than 20 mesh, as in Example 4).

The potassium-enriched aluminosilicates produced in Examples 1 to 3 were suitable for use as raw materials in the preparation of ceramic electrical insulation, specialty glass products, and the like.

Having thus fully described the invention, what is desired to be secured by Letters Patent is:

1. The method of treating a sodium-containing aluminosilicate to produce a potassium-enriched aluminosilicate of discrete particulate form retaining the original aluminosilicate structure, which comprises admixing said aluminosilicate in finely divided form with a neutral potassium salt reducible by carbon and a carbonaceous material in proportions to provide a K/Al molar ratio of potassium added as said neutral potassium salt to aluminum in said aluminosilicate of between about 1.25:1 and about 2.5:1, and to provide a weight ratio of said neutral potassium salt to said carbonaceous material of between about 3:1 and about 40:1, heating the resulting mixture at a temperature above about 1200° F. but below the fusion temperature thereof for at least about 10 minutes, leaching water-soluble substances from the heat-treated mixture with an aqueous medium, whereby said mixture disintegrates into discrete particulate form, and drying the resulting solids, said solids being an aluminosilicate of increased potassium to aluminum ratio, retaining the original aluminosilicate structure.

2. The method of claim 1 wherein said mixture is heated to a temperature between about 1400 and about 1600° F.

3. The method of claim 1 wherein said aluminosilicate is feldspar.

4. The method of claim 1 wherein the particle size of the reactants in said mixture is less than about 60 mesh.

5. The method of preparing a potassium-enriched feldspar from a sodium-containing feldspar which comprises admixing said feldspar with potassium sulfate and carbon in proportions to provide a K/Al molar ratio of potassium added as potassium sulfate to aluminum in the feldspar of between about 1.3:1 and about 2.3:1, and to provide a weight ratio of potassium sulfate to carbon of between 3:1 and about 40:1, substantially all of the particles in said mixture passing a 60 mesh screen, heating said mixture at a temperature in the range above about 1200° F. and below the fusion temperature of the mixture for between about ½ and about 5 hours, leaching water-soluble compounds from said heat-treated solids with an aqueous medium, whereby the solids are converted to discrete particulate form, separating the solids from the aqueous medium, and drying the solids.

6. The method of claim 5 wherein the aqueous medium remaining after leaching and separation of solids is admixed with sufficient glaserite to increase the specific gravity of the solution up to about 1.17, whereby potassium sulfate precipitates, separating the potassium sulfate from the solution, recycling potassium sulfate for reaction with additional aluminosilicate, evaporating the solution to reduce the water content to between about 45 and about 50% by weight, whereby glaserite is precipitated, separating glaserite from the glaserite mother liquor and recycling said glaserite for reaction with additional aqueous medium recovered from the leaching step.

7. The method of claim 5 wherein said carbon is a vegetable carbon.

References Cited in the file of this patent

UNITED STATES PATENTS 2,000,338     Kliefoth _____ May 7, 1935